United States Patent
Chen

(10) Patent No.: US 8,382,559 B2
(45) Date of Patent: Feb. 26, 2013

(54) NEGATIVE PRESSURE DUST COLLECTION STRUCTURE FOR POWER TOOLS

(75) Inventor: Bach Pangho Chen, Claremont, CA (US)

(73) Assignee: X'Pole Precision Tools Inc., Chung-Li, Taoyuan County (TW)

( * ) Notice: Subject to any disclaimer, the term of this patent is extended or adjusted under 35 U.S.C. 154(b) by 352 days.

(21) Appl. No.: 12/757,533

(22) Filed: Apr. 9, 2010

(65) Prior Publication Data

US 2011/0250828 A1  Oct. 13, 2011

(51) Int. Cl.
*B24B 55/06* (2006.01)
(52) U.S. Cl. ........ 451/456; 451/350; 451/353; 451/357; 451/359
(58) Field of Classification Search .................. 451/456, 451/350–359; 15/339, 347, 422.1
See application file for complete search history.

(56) References Cited

U.S. PATENT DOCUMENTS

| | | | | |
|---|---|---|---|---|
| 4,422,239 A * | 12/1983 | Maier et al. | | 30/124 |
| 5,419,737 A * | 5/1995 | Brazell et al. | | 451/453 |
| 5,531,639 A * | 7/1996 | Catalfamo | | 451/456 |
| 6,746,321 B2 * | 6/2004 | Link | | 451/354 |
| 6,969,311 B2 * | 11/2005 | Chen et al. | | 451/359 |
| 7,094,138 B2 * | 8/2006 | Chang | | 451/359 |
| 7,118,467 B2 * | 10/2006 | Sun et al. | | 451/359 |
| 7,118,609 B2 * | 10/2006 | Valentini | | 55/385.1 |
| 2002/0028645 A1 * | 3/2002 | Link | | 451/344 |
| 2002/0111127 A1 * | 8/2002 | Tseng | | 451/358 |
| 2003/0013396 A1 * | 1/2003 | Sun et al. | | 451/456 |
| 2003/0079366 A1 * | 5/2003 | Chang | | 34/96 |
| 2003/0119436 A1 * | 6/2003 | Ohlendorf | | 451/456 |
| 2006/0189268 A1 * | 8/2006 | Falk | | 451/359 |

FOREIGN PATENT DOCUMENTS

| | | |
|---|---|---|
| TW | 493485 | 7/2002 |
| TW | M245007 | 10/2004 |
| TW | I260255 | 8/2006 |
| TW | M349818 | 2/2009 |

* cited by examiner

*Primary Examiner* — George Nguyen
(74) *Attorney, Agent, or Firm* — Muncy, Geissler, Olds & Lowe, PLLC

(57) ABSTRACT

A negative pressure dust collection structure aims to be used on a power tool which is coupled with an application tool operable in a working space surrounded by a dust collection hood. The dust collection hood includes at least one flow conduction vent communicating with an airflow duct through a negative pressure enhancing duct. The negative pressure enhancing duct has a negative pressure enhancing chamber communicating with the flow conduction vent. The negative pressure enhancing chamber is formed at a cross section shrunk gradually from the flow conduction vent towards the airflow duct to increase suction of the negative pressure enhancing duct to collect dust in the dust collection hood. Moreover, the negative pressure enhancing chamber has an opening edge mating the shape of the inner side of the wall of the dust collection hood to increase covering range of the airflow.

8 Claims, 4 Drawing Sheets

NEGATIVE PRESSURE DUST COLLECTION STRUCTURE FOR POWER TOOLS

FIELD OF THE INVENTION

The present invention relates to a negative pressure dust collection structure for power tools and particularly to a dust collection structure with an improved flow conduction duct.

BACKGROUND OF THE INVENTION

Small power tools (including pneumatic or electric ones) are well accepted on the market due to their smaller size and lower prices and energy consumption. The power tools include a wide variety of types, such as emery wheel machines, drilling machines, pneumatic (or electric) wrenches and the like. Some of the power tools aim for drilling, sanding or grinding, and a great amount of dust is produced in the working places during operation. It is hazardous to the health of workers. Hence a lot of improved structures are developed for power tools to solve the dust scattering problem. For instance, R.O.C. patent No. M349818 entitled "Improved grinding machine" provides a casing and a handgrip at one side. The handgrip has an input portion (121) and an output portion (122). The input portion receives electric power or high pressure air needed for operation. The output portion aims to discharge dust, impurities and mist generated on the surface of working pieces during sanding or grinding operation. Referring to the specification and FIG. 5 of aforesaid reference, the output portion is an air discharge duct to inhale airflow and discharge waste such as dust and the like. It provides some improvements on the dust scattering problem. Similar structures of power tools can be found in R.O.C. patent Nos. M245007, I260255 and 493485.

While the aforesaid references provide dust inhalation function, they have a common drawback. Take R.O.C. patent No. M349818 as an example, in its FIG. 5, the air discharge duct has an opening formed on a hood surrounding a grinding pad (3), and the opening is connected to the output portion (122), i.e. the air discharge duct. Then the air discharge duct is connected to an inhalation device to generate suction in the output portion to inhale the dust and impurities into the output portion. The suction is stronger at the front side of the opening due to its shape and location, but deceases significantly after deviating slightly from the opening. Moreover, the junction of the edge of the opening and the hood forms an angle over seventy degrees, and results in a great power loss of the air at the angle. Hence the suction at two sides of the opening is much lower. In short, the aforesaid problems make suction airflow strength uneven in the hood, and result in a portion of the dust cannot be drawn into the air discharge duct and scatter outside the hood. Not only the power of the inhalation device connected to the air discharge duct is wasted, it also creates a lot of energy waste.

SUMMARY OF THE INVENTION

In view of the shortcoming of lower efficiency of the conventional dust collection structures, the primary object of the present invention is to provide an improved dust collection structure that has a more efficient dust collection duct and a dust collection hood mating the dust collection duct to improve dust collection range and efficiency.

The present invention provides negative pressure dust collection structure for power tools. The power tool is coupled with an application tool which operates in a working space surrounded by a dust collection hood. The dust collection hood has at least one flow conduction vent communicating with an airflow duct through a negative pressure enhancing duct. The invention further provides features as follow: the negative pressure enhancing duct has a negative pressure enhancing chamber which communicates with the flow conduction vent and is formed at a cross section shrunk gradually from the flow conduction vent towards the airflow duct to increase suction of the negative pressure enhancing duct to collect dust in the dust collection hood. The negative pressure enhancing chamber further has an opening with the edge mating the shape of the inner edge of the wall of the dust collection hood to increase the range of the airflow suction.

As the cross section of the negative pressure enhancing chamber is shrunk gradually towards a converging space, the suction is enhanced. Moreover, due to the extension of the range of the airflow suction, the suction of the negative pressure airflow to the dust collection hood is more uniform. Thus the problems of uneven suction in the dust collection hood and power consumption can be improved The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
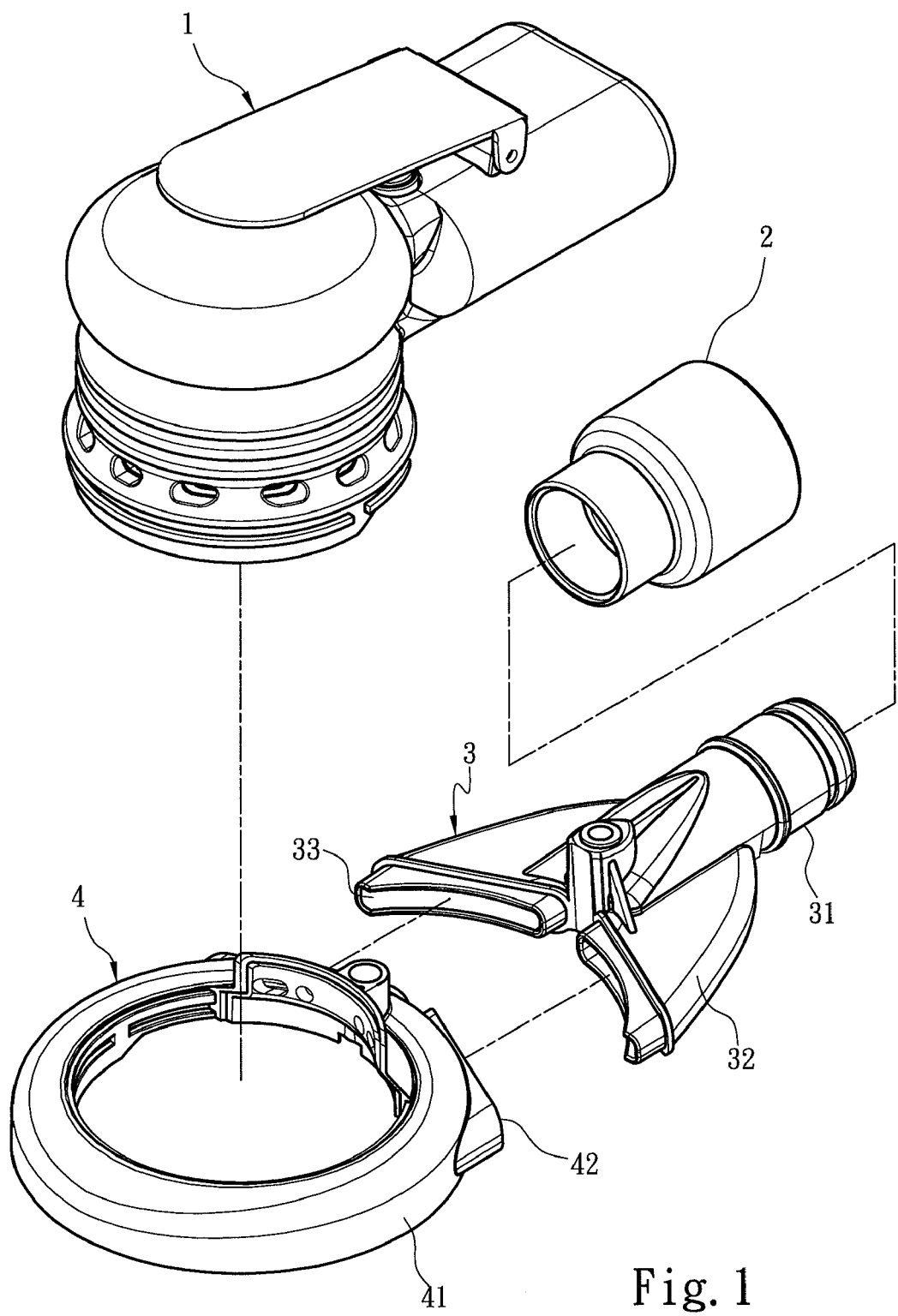
FIG. 1 is an exploded view of an embodiment of the invention.
Figure 2:
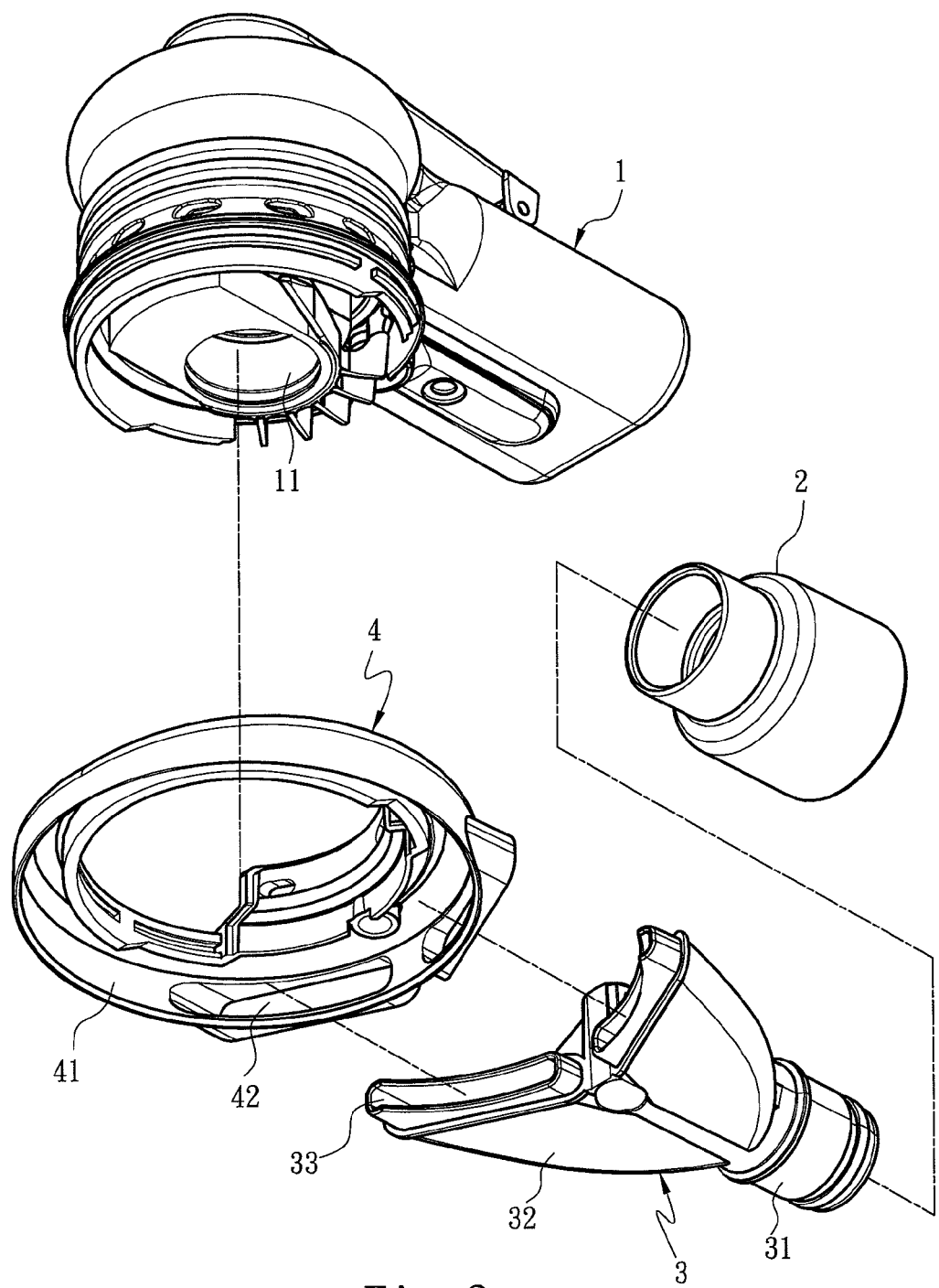
FIG. 2 is another exploded view of an embodiment of the invention.

Please refer to FIGS. 1 through 4, the negative pressure dust collection structure according to the invention is located on a power tool 1 which has an output portion 11 at one end to couple with an application tool operable in a working space surrounded by a dust collection hood 4. The power tool 1 may be a pneumatic or electric mechanism held by a user to control operation of the output portion 11. This is a technique known in the art and forms no part of the invention, thus the internal detailed structure of the power tool 1 is omitted. The dust collection hood 4 is connected to the power tool 1, and has a wall 41 surrounding the working space. The wall 41 has at least one flow conduction vent 42 connected to a negative pressure enhancing duct 3 communicating with an airflow duct 2. The airflow duct 2 is connected to a negative pressure source. Theoretically, airflow stops when air pressure is in a balanced condition, but flows to where the pressure is lower in the event that the pressure is unbalanced. Hence in order to collect air and dust in the dust collection hood 4, a pressure source lower than the dust collection hood 4 must be provided. The "negative pressure" means that the pressure in the negative pressure enhancing duct 3 is lower than that of the dust collection hood 4 so that the air in the dust collection hood 4 can flow towards the negative pressure enhancing duct 3. The negative pressure source aims to generate airflow collecting the dust and make the air flow through mechanical operation to produce pressure alteration to suck and carry the dust in the working space out along the airflow direction. The physical implementation of negative pressure source also is a technique known in the art, thus details also are omitted. The negative pressure enhancing duct 3 includes at least one conformal opening 33, a coupling portion 31 and a negative pressure enhancing portion 32 located between the conformal opening 33 and coupling portion 31. The coupling portion 31 has a converging space 311 (referring to FIGS. 3 and 4) connected with the airflow duct 2. The converging space 311 is formed at a cross section smaller than the inner cross section of the airflow duct 2. The negative pressure enhancing portion 32 has one end connected with the coupling portion 31 and a negative pressure enhancing chamber 321 (referring to FIGS. 3 and 4) communicating with the converging space 311 (referring to FIGS. 3 and 4). The conformal opening 33 is located at another end of the negative pressure enhancing portion 32 communicating with the negative pressure enhancing chamber 321. The negative pressure enhancing chamber 321 is formed at a cross section shrunk gradually from the flow conduction vent 42 towards the airflow duct 2 to increase suction of the negative pressure enhancing duct 3 to collect dust in the dust collection hood 4. More specifically, the conformal opening 33 is connected to the flow conduction vent 42 of the dust collection hood 4, and the number of the flow conduction vent 42 mating the conformal opening 33 so that the airflow in the negative pressure enhancing duct 3 can suck away the dust in the dust collection hood 4. To meet this purpose, the negative pressure enhancing duct 3 includes an airflow path with features as follow: the converging space 311 is formed at a cross section smaller than the inner cross section of the airflow duct 2, and the negative pressure enhancing chamber 321 has a cross section gradually shrunk from the conformal opening 33 towards the converging space 311. The negative pressure enhancing chamber 321 has gradually shrunk cross section, and the cross section of the converging space 311 also is smaller than inner cross section of the airflow duct 2, the flowing speed of the airflow passing through the negative pressure enhancing duct 3 has to be accelerated to reach flow balance. As a result, the suction of the airflow is increased. Moreover, the conformal opening 33 at one end of the negative pressure enhancing chamber 321 also can be expanded to mate the opening width of the dust collection hood 4 to increase the range of the suction. This also helps to reduce power consumption of the airflow entering the conformal opening 33.

Figure 3:
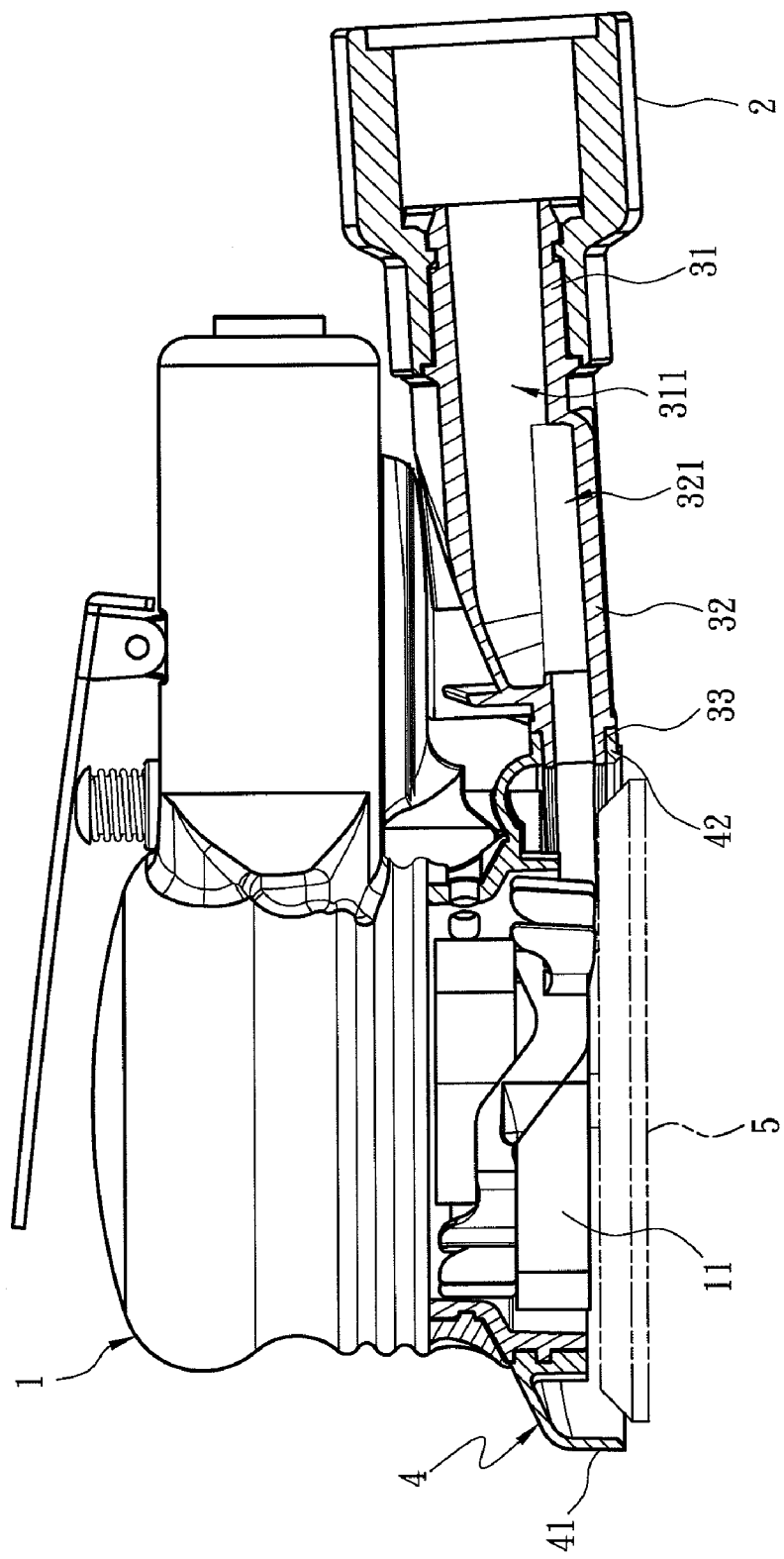
FIG. 3 is a sectional view of the negative pressure enhancing duct of the invention.
Figure 4:
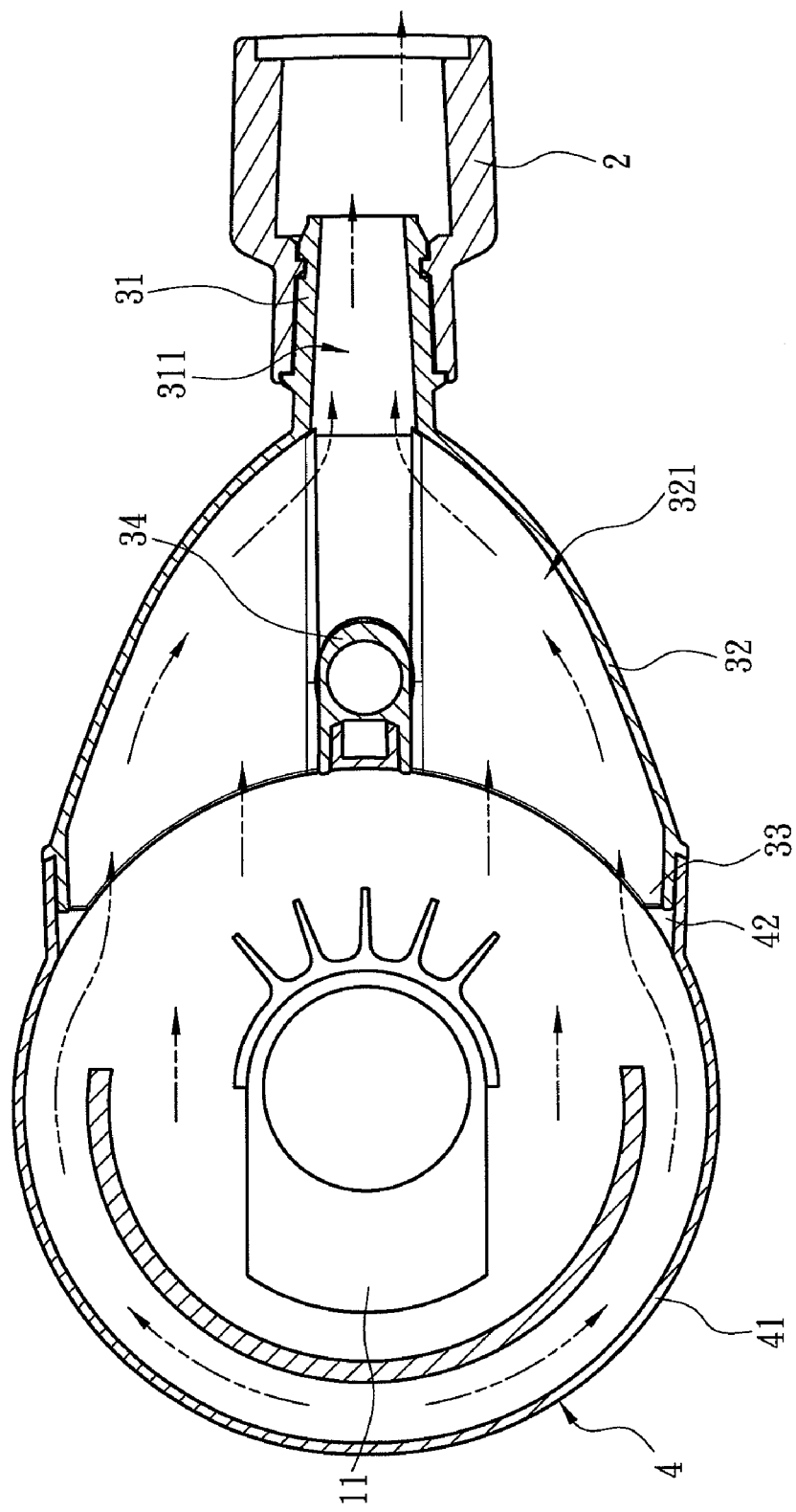
FIG. 4 is another sectional view of the negative pressure enhancing duct of the invention.

Referring to FIGS. 1 through 4, the negative pressure enhancing duct 3 further includes at least one spacer 34 in the negative pressure enhancing chamber 321 to divide it into a plurality of airflow channels and the negative pressure enhancing duct 3 has a plurality of conformal openings 33 communicating with the airflow channels. FIGS. 1 through 4 show that the negative pressure enhancing chamber 321 is divided by one spacer 34 to form two airflow channels communicating with two conformal openings 33 in a Y-shaped fashion with the two conformal openings 33 at two distal ends to form a Y-shaped dual dust collection ducts. Referring to FIG. 3, the negative pressure enhancing chamber 321 is formed at a cross section with a height smaller than that of the converging space 311. As shown in FIG. 4, the cross section of the negative pressure enhancing chamber 321 has a width shrunk gradually from the conformal opening 33 towards the converging space 311. The width of the conformal opening 33 can cover wider range to increase the dust collection scope and also improve the uneven suction. Moreover, the conformal opening 33 has an edge mating the inner shape of the wall 41 to form a smooth connection. FIGS. 1 through 4 illustrate an embodiment with an arched inner side of the wall 41 surrounding a grinding wheel 5. The conformal opening 33 also has an arched edge mating the inner side of the wall 41. The negative pressure enhancing chamber 321 has a distal end formed at a cross section with a width smaller than or equal to the width of the inner side of the wall 41. With the cross section width of the distal end of the negative pressure enhancing chamber 321 more approaches to the width of the inner side of the dust collection hood 4. The smaller the angle formed between the edge of the conformal opening 33 and the wall 41, the smoother the airflow passing through the conformal opening 33, thus can improve the problem of greater decreasing of pneumatic power (suction) near the conformal opening 33. By means of the foregoing features, the suction is more uniform and the covering range is expanded, kinetic energy loss of airflow can be reduced. As a result, a desired dust collection effect can be achieved with smaller power to reduce energy waste.

As a conclusion, the technique provided by the invention can improve dust collection effect and is adaptable to the power tool or other application tools by those skilled in the art. The dust collection hood 4 is not limited to the annular structure as depicted in the disclosed embodiment. It can be formed with an opening or in a semicircular fashion to facilitate operation of the application tool (such as the grinding wheel 5 or the like).

In summation of the above description, the present invention provides a significant improvement over the conventional techniques and complies with the patent application requirements, and is submitted for review and granting of the commensurate patent rights.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A negative pressure dust collection structure for power tools comprising a dust collection hood which includes at least one flow conduction vent communicating with an airflow duct through a negative pressure enhancing duct to allow a power tool to couple with an application tool operable in a working space surrounded by the dust collection hood, wherein:

the negative pressure enhancing duct includes a negative pressure enhancing chamber which communicates with the flow conduction vent and is formed at a cross section shrunk gradually from the flow conduction vent towards the airflow duct to increase suction of the negative pressure enhancing duct to collect dust in the dust collection hood;

wherein the negative pressure enhancing chamber includes at least one spacer to divide the negative pressure enhancing chamber into a plurality of airflow channels, the negative pressure enhancing duct including a plurality of conformal openings communicating with the airflow channels.

2. The negative pressure dust collection structure of claim 1, wherein the negative pressure enhancing duct includes at least one conformal opening, a coupling portion connected to the airflow duct and a negative pressure enhancing portion located between the conformal opening and the coupling portion; wherein the flow conduction vent is formed at a number mating the conformal opening and communicating therewith, the negative pressure enhancing chamber being located in the negative pressure enhancing portion, the coupling portion including a converging space formed at a cross section smaller than an inner cross section of the airflow duct, the negative pressure enhancing chamber communicating with the converging space to convey airflow and the collected dust to the negative pressure enhancing duct through the converging space.

3. The negative pressure dust collection structure of claim 2, wherein the cross section of the negative pressure enhancing chamber is formed at a height smaller than that of the converging space and at a width shrunk gradually from one end connected to the dust collection hood towards the airflow duct.

4. The negative pressure dust collection structure of claim 2, wherein the dust collection hood includes a wall surrounding the working space, the conformal opening including an edge mating the shape of an inner side of the wall to form smooth connection therewith.

5. The negative pressure dust collection structure of claim 4, wherein the inner side of the dust collection hood is formed in an arched manner to surround the application tool, the conformal opening including an arched edge mating the inner side of the dust collection hood.

6. The negative pressure dust collection structure of claim 5, wherein the negative pressure enhancing chamber includes a distal end formed at a cross section width smaller than or equal to the width of the inner side of the wall.

7. The negative pressure dust collection structure of claim 1, wherein the application tool is a grinding wheel.

8. The negative pressure dust collection structure of claim 1, wherein the cross section of the negative pressure enhancing chamber is formed at a height smaller than that of the converging space and at a width shrunk gradually from one end connected to the dust collection hood towards the airflow duct.

* * * * *